United States Patent [19]

Grossner et al.

[11] 4,329,871
[45] May 18, 1982

[54] UNDESIRABLE COMBUSTION CHARACTERISTIC DETECTION APPARATUS

[75] Inventors: Horst Grossner, Berglen; Ingo Dudeck, Weinstadt; Manfred Maass, Esslingen, all of Fed. Rep. of Germany

[73] Assignee: Daimler-Benz Aktiengesellschaft, Stuttgart, Fed. Rep. of Germany

[21] Appl. No.: 151,990

[22] Filed: May 21, 1980

[30] Foreign Application Priority Data

Jun. 7, 1979 [DE] Fed. Rep. of Germany ....... 2923056

[51] Int. Cl.³ ............................................ G01L 23/22
[52] U.S. Cl. ...................................................... 73/35
[58] Field of Search ..................... 73/35; 123/425, 435

[56] References Cited

U.S. PATENT DOCUMENTS 3,822,583  7/1974  Keller et al. ............................. 73/35
4,236,491  12/1980  Hattori et al. ...................... 123/425

Primary Examiner—James J. Gill
Attorney, Agent, or Firm—Craig & Antonelli

[57] ABSTRACT

An apparatus for detecting undesirable combustion characteristics in spark-ignited internal combustion engines. A sensor and a band-pass filter tuned to the frequency of the knock vibration are provided with an output of the band-pass filter being compared with a reference value. The result of the comparison is correlated with undesirable combustion characteristics to be recognized. A rectifier is provided for solid-borne sound signals received by the sensor with the signals passing through the band-pass filter. The signal is rectified in the rectifier to a knock signal and a series circuit made up of a band-stop filter tuned to the frequency of the knock vibration, an rms rectifier, and an amplifier is provided by means of which the sound signal received by the sensor is converted into a reference signal. A comparator is provided when the reference signal and the knock signal are compared with each other and an output signal appears if the knock signal exceeds the reference signal.

6 Claims, 1 Drawing Figure

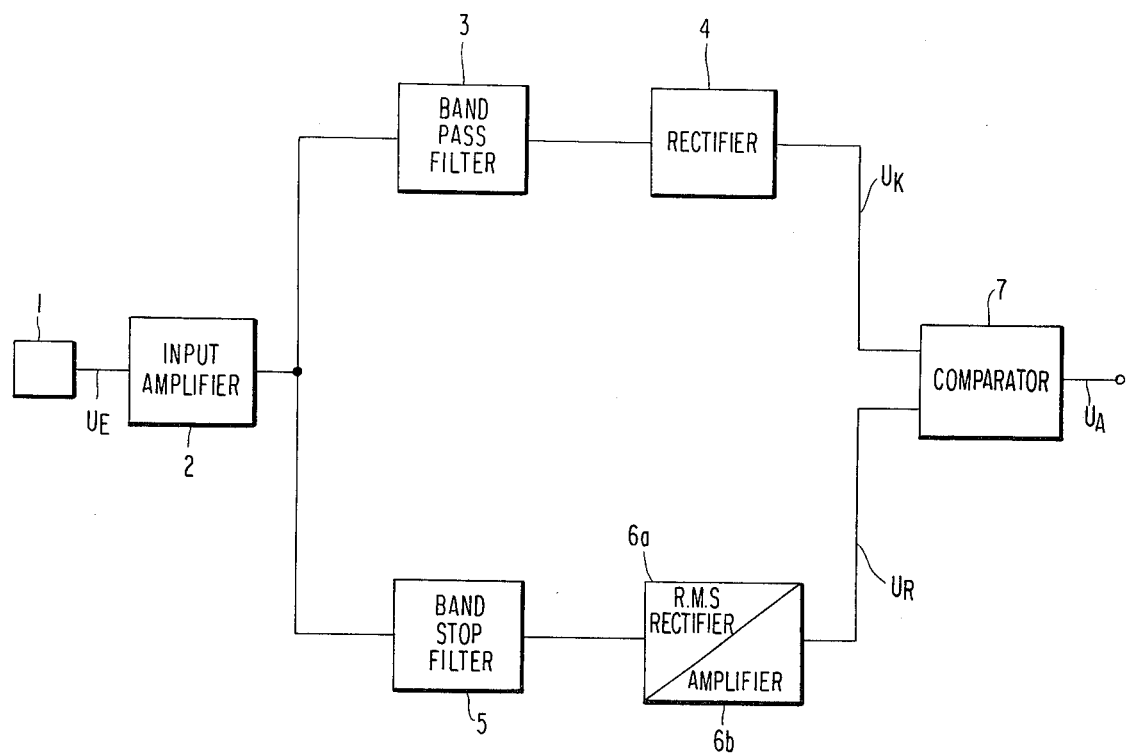

UNDESIRABLE COMBUSTION CHARACTERISTIC DETECTION APPARATUS

The present invention relates to a detection apparatus and, more particularly, to an apparatus for detecting undesirable combustion characteristics in spark-ignited internal combustion engines, which apparatus includes an acceleration sensor and a band-pass filter tuned to a frequency of a knock vibration of the engine, with an output signal of the band-pass filter being compared with a reference signal or value, and with the result of the comparison being correlated with undesirable combustion characteristics to be recognized.

An arrangement of the aforementioned type is proposed in, for example, U.S. Pat. No. 4,012,942, wherein a second sensor produces a signal related or associated to the number of revolutions of the internal combustion engine. From the signal of the second sensor, a background noise reference signal is subtracted from the square of the output signal of the band-pass filter and thus forms a "knock intensity" signal. The "knock intensity" signal is compared with another speed dependent "knock" limit signal or value. As a result of this comparison, a signal is provided which permits a recognition of intensity and frequency of so-called "pinging" of the engine.

A disadvantage of the aforementioned proposed arrangement resides in the fact that a relationship between background noise and speed of the engine is dependent on the type as well as on the particular engine involved. Consequently, what is required is an exact adjustment which must be repeated at regular intervals since it is inconstant due to mechanical, thermal, and other influences.

A further disadvantage of the aforementioned proposed construction resides in the fact that two different sensors with differing sensitivies are employed and, as can readily be appreciated, variations in the two different sensors can affect the measuring result.

The so-called "pinging" of an internal combustion engine arises if the fuel-air mixture is combusted not only starting with the ignition spark but there is also a spontaneous ignition in front of the propagating flame front due to a rise in pressure and temperature. This uncontrolled combustion is deleterious to the internal combustion engine for it can cause higher mechanical and thermal stresses. This "pinging" of the internal combustion engine may be the result of, inter alia, load changes of the engine. To overcome this "pinging" condition, one possibility is a change in the ignition timing.

The noise spectrum caused by "pinging" lies in a frequency range of about 7 kHz. Recognition of the "pinging" is somewhat difficult due to the fact that similar noises, for example, noises evoked by the valve strokes, also lie within this frequency range. Furthermore, the entire noise level changes approximately by a factor of 10 over a speed range from idling speed to maximum speed of the engine.

The aim underlying the present invention essentially resides in providing an apparatus for detecting undesirable combustion characteristics in spark-ignited internal combustion engines which is neither speed dependent, dependent on the particular type of engine, nor requires readjustment at regular or specific intervals.

In accordance with advantageous features of the present invention, a rectifier for a solid-borne sound signal is provided. The sound signal is received by an acceleration sensor and passed through a band-pass filter. In the rectifier, the sound signal is rectified to a knock frequency or signal. A band stop filter tuned to the knock frequency, a root mean square (rms) value rectifier, and an amplifier are connected in series by means of which the solid-borne sound signal received by the acceleration sensor is converted into a reference signal. A comparator is provided for receiving the reference signal and comparing such reference signal with the signal of the knock frequency. An output signal is provided from the comparator if the signal of the knock frequency exceeds the reference signal.

By virtue of the above-noted features of the present invention, only one sensor is required from which the measurement signal and the reference signal are obtained so that an automatic adjustment takes place.

To adapt the detecting apparatus of the present invention to given or set conditions, advantageously, in accordance with further features of the present invention, the reference signal is given a linear or nonlinear amplification.

Accordingly, it is an object of the present invention to provide an apparatus for detecting undesirable combustion characteristics in spark-ignited internal combustion engines which avoids, by simple means, shortcomings and disadvantages encountered in the prior art.

Another object of the present invention resides in providing an apparatus for detecting undesirable combustion characteristics in spark-ignited internal combustion engines which is economical to manufacture due to the lower requirement of structural components.

Yet another object of the present invention resides in providing an apparatus for detecting undesirable combustion characteristics in spark-ignited internal combustion engines which is uninfluenced by mechanical, thermal, and other conditions.

A further object of the present invention resides in providing an apparatus for detecting undesirable combustion characteristics in spark-ignited internal combustion engines which functions reliably under all operating conditions of the engines.

A still further object of the present invention resides in providing an apparatus for detecting undesirable combustion characteristics in spark-ignited internal combustion engines which enables an adjustment of, for example, the ignition timing, so as to correct for the undesirable combustion characteristics.

These and further objects, features and advantages of the present invention will become more apparent from the following description when taken in connection with the accompanying drawing which shows, for the purpose of illustration only, one embodiment in accordance with the present invention, and wherein:

The single FIGURE of the drawing is a schematic block diagram of an apparatus for detecting undesirable combustion characteristics in spark-ignited internal combustion engines in accordance with the present invention.

Before describing, in detail, the particular improved detecting apparatus in accordance with the present invention, it should be observed that the present invention resides primarily in the novel structural combination of conventional components and not in the particular detailed configurations thereof. Accordingly, the structure, control, and arrangement of these conventional components are illustrated in the single FIGURE of the drawing by readily understandable block representations in order not to obscure the disclosure with structural details which would be readily apparent to those skilled in the art having the benefit of the description herein. Thus, the block diagram illustration of the single FIGURE of the drawing does not necessarily represent the mechanical structural arrangement of the exemplary system, but is primarily intended to illustrate the major structural components of this system in a convenient functional grouping so that the present invention can more readily be understood.

Referring now to the single FIGURE of the drawing, an acceleration sensor such as, for example, a piezoelectric crystal transducer for absorbing solid-borne sound is arranged at a suitable place such as, for example, a cylinder head (not shown) of an internal combustion engine (not shown). The acceleration sensor 1 provides an output signal $U_E$ of the solid-borne sound sensed thereby, with the output signal being fed to an input amplifier 2, the output of which is connected to a band-pass filter 3 and a band-stop filter 5.

The band-pass filter 3 provides an output signal to a rectifier 4 with the band-stop filter 5 providing an output signal to an rms rectifier 6a and an amplifier 6b. The amplifier 6b may be a linear or nonlinear amplifier or, in certain applications, the amplifier 6b may be omitted.

An output signal $U_K$ of the rectifier 4 and an output signal $U_R$ of the amplifier 6b are connected to an form inputs of a comparator 7. The band-pass filter 3 and the band-stop filter 5 are set to a knocking frequency $f_K$ of 7 kHz. In other words, the band-pass filer 3 amplifies the knocking frequency $f_K$ and the band-stop filter 5 suppresses the knocking frequency $f_K$.

The solid-borne sound signal $U_E$ of the acceleration sensor or pick-up 1 is raised in the input amplifier 2 to the required level and simultaneously fed to both the band-pass filter 3 and band-stop filter 5. In the band-pass filter 3, a signal having the frequency $f_K$, if present, is amplified and all other frequencies are attenuated. The signal from the band-pass filter 3 is rectified in the rectifier forming an output or knock signal $U_K$.

In the band-stop filter 5, the signal having the frequency $f_K$ is attenuated. After passing through the rms rectifier 6a, the residual signal components form the mean value of the solid-borne sound signal, with this value representing, after linear amplification in the amplifier 6b, a threshhold value for the knock signal which represents an output or reference signal $U_R$.

The signals $U_K$ and $U_R$ from the rectifier 4 and linear amplifier 6b are fed and compared with each other in the comparator 7. If the output or knock signal $U_K$ exceeds the reference signal $U_R$, the comparator 7 yields an output signal $U_A$ which may be utilized to, for example, shift the ignition timing in a known manner.

The comparator 7 yields a signal $U_A$ in all cases where, with the input signal $U_E$, vibrations of the frequency range $f_K$ are received and those vibrations exceed a certain level with respect to the remaining frequencies. Since a relative comparison takes place in the comparator 7, a constant adjusting of the detecting apparatus is unnecessary.

While we have shown and described only one embodiment in accordance with the present invention, it is understood that the same is not limited thereto but is susceptible of numerous changes and modifications as known to one having ordinary skill in the art and we, therefore, do not wish to be limited to the details shown and described herein but intend to cover all such changes and modifications as are encompassed by the scope of the appended claims.

We claim:

1. Device for recognizing undesired combustion processes in internal combustion engines with conventional ignition systems by means of an acceleration sensor, a band-pass filter tuned to the frequency of the knocking vibrations, rectifiers located in the signal path of the knocking signal and of a reference signal path, and a comparator, whose output signal is assigned to the undesired combustion processes to be recognized, characterized by the fact that the band-pass filter is disposed with one rectifier in the signal path of the knocking signal and by the fact that in the signal path of the reference signal, there is a series circuit composed of a band elimination filter means tuned to the knocking frequency, a rectifier, and an amplifier, whereby the rectifier is an RMS rectifier and whereby the body noise signal is converted into the reference signal by the series circuit when it is received from the acceleration sensor.

2. An apparatus according to claim 1, characterized in that the reference signal path includes a band elimination filter means tuned to the frequency of the knock vibration and the RMS rectifier means is arranged in series with the band elimination filter means, and in that the output signal of the sensor means is fed to the band elimination filter means and an output signal from the band elimination filter means is fed to the RMS rectifier means.

3. An apparatus according to claim 2, characterized in that the reference signal path further includes an amplifier means for amplifying an output signal of the RMS rectifier means and for providing an output signal to the comparator means.

4. An apparatus according to claim 3, characterized in that the amplifier means is a linear amplifier.

5. An apparatus according to claim 3, characterized in that the amplifier means is a nonlinear amplifier.

6. An apparatus according to one of claims 2, 3, 4, 5 or 1 characterized in that an input amplifier means is disposed between the sensor means and the band-pass filter means and reference signal path for amplifying the output signal of the sensor means prior to an output signal being fed to the band-pass filter means and reference signal path.

* * * * *